US011416582B2

(12) United States Patent
Boussac et al.

(10) Patent No.: US 11,416,582 B2
(45) Date of Patent: Aug. 16, 2022

(54) METHOD AND DEVICE FOR ESTIMATING A NUMBER OF DISTINCT SUBSCRIBERS OF A TELECOMMUNICATION NETWORK IMPACTED BY NETWORK ISSUES

(71) Applicant: EXFO Solutions SAS, Saint-Jacques-de-la-Lande (FR)

(72) Inventors: Thierry Boussac, Rennes (FR); Richard Cruceanu, Dollard-des-Ormeaux (CA)

(73) Assignee: EXFO Solutions SAS, Saint-Jacques-de-la-Lande (FR)

(*) Notice: Subject to any disclaimer, the term of this patent is extended or adjusted under 35 U.S.C. 154(b) by 89 days.

(21) Appl. No.: 17/147,696

(22) Filed: Jan. 13, 2021

(65) Prior Publication Data
US 2021/0224353 A1 Jul. 22, 2021

Related U.S. Application Data

(60) Provisional application No. 62/975,414, filed on Feb. 12, 2020, provisional application No. 62/963,324, filed on Jan. 20, 2020.

(51) Int. Cl.
*H04W 24/10* (2009.01)
*G06F 17/18* (2006.01)
(52) U.S. Cl.
CPC ............ *G06F 17/18* (2013.01); *H04W 24/10* (2013.01)
(58) Field of Classification Search
CPC ..... H04W 24/04; H04W 24/08; H04W 24/10; H04W 4/24
See application file for complete search history.

(56) References Cited

U.S. PATENT DOCUMENTS 9,007,919 B2 4/2015 Ivanyi et al.
9,026,851 B2 5/2015 Mondal et al.
(Continued)

FOREIGN PATENT DOCUMENTS

WO 2017172541 A 10/2017

OTHER PUBLICATIONS

Bonelli et al., A Probabilistic Counting Framework for Distributed Measurements,IEEE Access, vol. 7, 2019,pp. 22644-22659, [online], [retrieved on Jan. 3, 2020], Retrieved from the Internet <URL: https://ieeexplore.ieee.org/stamp/stamp.jsp?arnumber=8641276>.
(Continued)

*Primary Examiner* — Kevin Kim
(74) *Attorney, Agent, or Firm* — Clements Bernard Baratta; Lawrence A. Baratta, Jr.

(57) ABSTRACT

A method and device for estimating a number of distinct subscribers of a telecommunication network impacted by network issues include, for a plurality of N successive counting periods preceding a current time, steps of determining, for each counting period, an estimate of a number of different subscribers impacted by at least one network issue by implementing a probabilistic counter structure, and storing at least one elementary counter in association to said counting period, aggregating the elementary counters in a multi-level final counter structure, wherein each level of the final counter structure has an associated probabilistic counter structure, the aggregation comprising, for each elementary counter: computing, for at least one level of the multi-level final counter structure, an intersection between said elementary counter and the probabilistic counter structure associated to said level of the multi-level final counter structure, and updating the multi-level final counter structure based on the intersection computed.

20 Claims, 4 Drawing Sheets

(56) References Cited

U.S. PATENT DOCUMENTS

| | | |
|---|---|---|
| 9,130,825 B2 | 9/2015 | Wilkinson |
| 9,507,756 B2 | 11/2016 | Arad et al. |
| 10,003,515 B1 | 6/2018 | Whiteside et al. |
| 10,120,905 B2 | 11/2018 | Gupta et al. |
| 10,581,664 B1 * | 3/2020 | Peng .................... H04L 41/147 |
| 10,686,681 B2 | 6/2020 | Medas et al. |
| 2015/0149609 A1 | 5/2015 | Zou et al. |
| 2015/0248680 A1 | 9/2015 | Chen et al. |
| 2016/0360433 A1 | 12/2016 | Vaderna |
| 2017/0208487 A1 * | 7/2017 | Ratakonda ............. H04L 43/18 |
| 2017/0295078 A1 | 10/2017 | Medas et al. |
| 2018/0181626 A1 | 6/2018 | Lyons et al. |

OTHER PUBLICATIONS

Steele et al., Adding Approximate Counters, ACM SIGPLAN Notices, vol. 51, No. 8, p. 15, 12 pages, Feb. 27, 2016, [online], [retrieved on Jan. 3, 2020]. Retrieved from the Internet <URL: https://jtristan.github.io/papers/ppopp16.pdf>.

Ting, Towards Optimal Cardinality Estimation of Unions and Intersections with Sketches, Proceedings of the 22nd ACM SIGKDD, International Conference on Knowledge Discovery and Data Mining, pp. 1195-1204, Aug. 13, 2016 [online], [retrieved on Jan. 3, 2020]. Retrieved from the Internet <URL: https://www.kdd.org/kdd2016/papers/files/rfp0467-tingA.pdf>.

Jun. 7, 2021, Extended European Search Report for European Patent Application No. EP 21 15 2237.

* cited by examiner

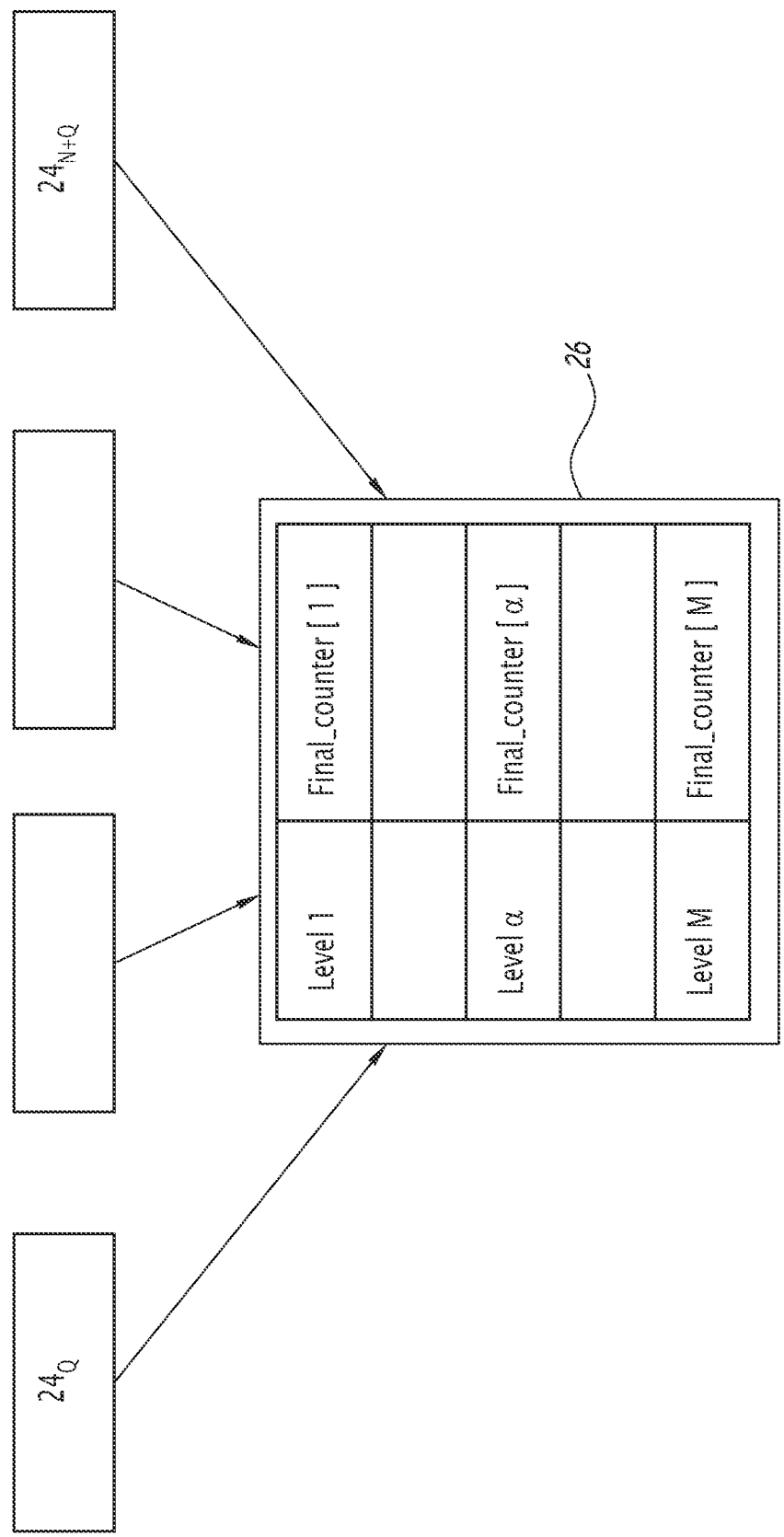

METHOD AND DEVICE FOR ESTIMATING A NUMBER OF DISTINCT SUBSCRIBERS OF A TELECOMMUNICATION NETWORK IMPACTED BY NETWORK ISSUES

CROSS-REFERENCE TO RELATED APPLICATIONS

The present disclosure claims priority to U.S. Provisional Patent Application Nos. 62/963,324 and 62/975,414, filed on Jan. 20, 2020 and Feb. 12, 2020, respectively, and the contents of which are incorporated by reference in their entirety.

FIELD OF THE DISCLOSURE

The present invention concerns a method for estimating a number of distinct subscribers of a telecommunication network impacted by network issues, and an associated device. The invention belongs to the field of monitoring the efficiency of telecommunication networks and measuring the impact on customers resulting from issues occurring in the telecommunication networks.

BACKGROUND OF THE DISCLOSURE

Monitoring the efficiency of telecommunication networks, in particular for mobile telecommunication, is a constant concern of telecommunication network operators. In particular, various tools for detecting network issues, such as failed communication sessions or data bearer drops, have been developed.

One important challenge of telecommunication network monitoring is counting, in real real-time, the number of subscribers who have experienced at least one network issue or service failure during a given period of time. Indeed, given that the number of subscribers may reach several millions, and up to tens of millions for mobile telecommunications network, real real-time counting of the actual number of subscribers impacted by network issues would require too many processing resources, in terms of processing power and of memory storage.

Patent application US2017/0295078 A1 describes a system used for identifying issues within a telecom network, wherein data is obtained from sources including probes and network elements and key performance indicators (KPIs) are identified for real-time streaming aggregation. The system proposed in this patent application uses an approximation, within a tolerance, of count-distinct subscribers aggregating by each KPI, using statistical tools such as HyperLogLog probabilistic algorithm, over a given time span. However, the method proposed only allows the estimation of the number of distinct subscribers that had at least one occurrence of a service failure over a given period of time.

There is a need to identify more precisely the number of subscribers experiencing service failures over time, in order to better assess the impact of these failures. Indeed, if one or several network issues occur regularly over successive periods of time and affect the same subscribers, these subscribers are likely to be highly inconvenienced. For a telecommunication network operator, it may be useful to estimate the number of distinct subscribers affected by one or several network issues in M different periods of time over a number of N successive periods of time

BRIEF SUMMARY OF THE DISCLOSURE

This and other objects are achieved by a method for estimating a number of distinct subscribers of a telecommunications network impacted by network issues implemented by a processor of a computing device, comprising, for a plurality of N successive counting periods preceding a current time:

determining, for each counting period, an estimate of a number of different subscribers impacted by at least one network issue by implementing a probabilistic counter structure, and storing at least one elementary counter in association to said counting period, aggregating the elementary counters in a multi-level final counter structure, wherein each level of the final counter structure has an associated probabilistic counter structure, the aggregation comprising, for each elementary counter:

computing, for at least one level of the multi-level final counter structure, an intersection between said elementary counter and the probabilistic counter structure associated to said level of the multi-level final counter structure, and updating the multi-level final counter structure based on the intersection computed.

In embodiments of the invention, the method for estimating a number of distinct subscribers of a telecommunications network impacted by network issues comprises one or more of the following features, considered alone or according to all technically possible combinations.

The updating of the multi-level final counter structure comprises adding the intersection computed for a given level of the multi-level final counter structure to the probabilistic counter structure of a next level of the multi-level final counter structure.

The updating of the multi-level final counter structure further comprises subtracting the intersection computed from the probabilistic counter structure of the given level of the multi-level final counter structure.

The method further comprises updating the elementary counter by subtracting the intersection computed from the probabilistic counter structure of said elementary counter.

For each elementary counter, the computing of an intersection and the updating are carried out for each level of the multi-level final counter structure.

The method further comprises, after carrying out the computing of an intersection and the updating for each level of the multi-level final counter structure, adding the probabilistic counter structure of said elementary counter to the first level of the multi-level final counter structure.

For estimating the number of distinct subscribers impacted by network issues in at least M distinct counting periods over N successive counting periods, the updating comprises adding the intersection computed for a given level $\alpha$ to the following level $\alpha+1$ of the multi-level final counter structure if $\alpha+1$ is smaller than M, or to level M of the multi-level final counter structure otherwise.

The determining, for each counting period, of an estimate of a number of different subscribers impacted by at least one network issue comprises receiving a data record comprising identifiers of subscribers impacted by network issues and processing said identifiers by a probabilistic cardinality estimation algorithm to obtain a probabilistic counter structure.

According to another aspect, the invention concerns a device for estimating a number of distinct subscribers of a telecommunications network impacted by network issues, comprising at least one processor configured to implement, for a plurality of N successive counting periods preceding a current time:

determining, for each counting period, an estimate of a number of different subscribers impacted by at least one network issue by implementing a probabilistic counter structure, and storing at least one elementary counter in association to said counting period, aggregating the elementary counters in a multi-level final counter structure, wherein each level of the final counter structure has an associated probabilistic counter structure, the aggregation comprising, for each elementary counter:

computing, for at least one level of the multi-level final counter structure, an intersection between said elementary counter and the probabilistic counter structure associated to said level of the multi-level final counter structure, and updating the multi-level final counter structure based on the intersection computed.

According to another aspect, the invention concerns a computer program product comprising software instructions which, when implemented by a programmable device, implement a method for estimating a number of distinct subscribers of a telecommunications network impacted by network issues as briefly described above

BRIEF DESCRIPTION OF THE DRAWINGS

Further characteristics and advantages of the present invention will become apparent from the following description, provided merely by way of non-limiting example, with reference to the enclosed drawings, in which:

FIG. 4 illustrates schematically a multi-level final counter structure and related elementary counters.

DETAILED DESCRIPTION OF THE DISCLOSURE

Figure 1:
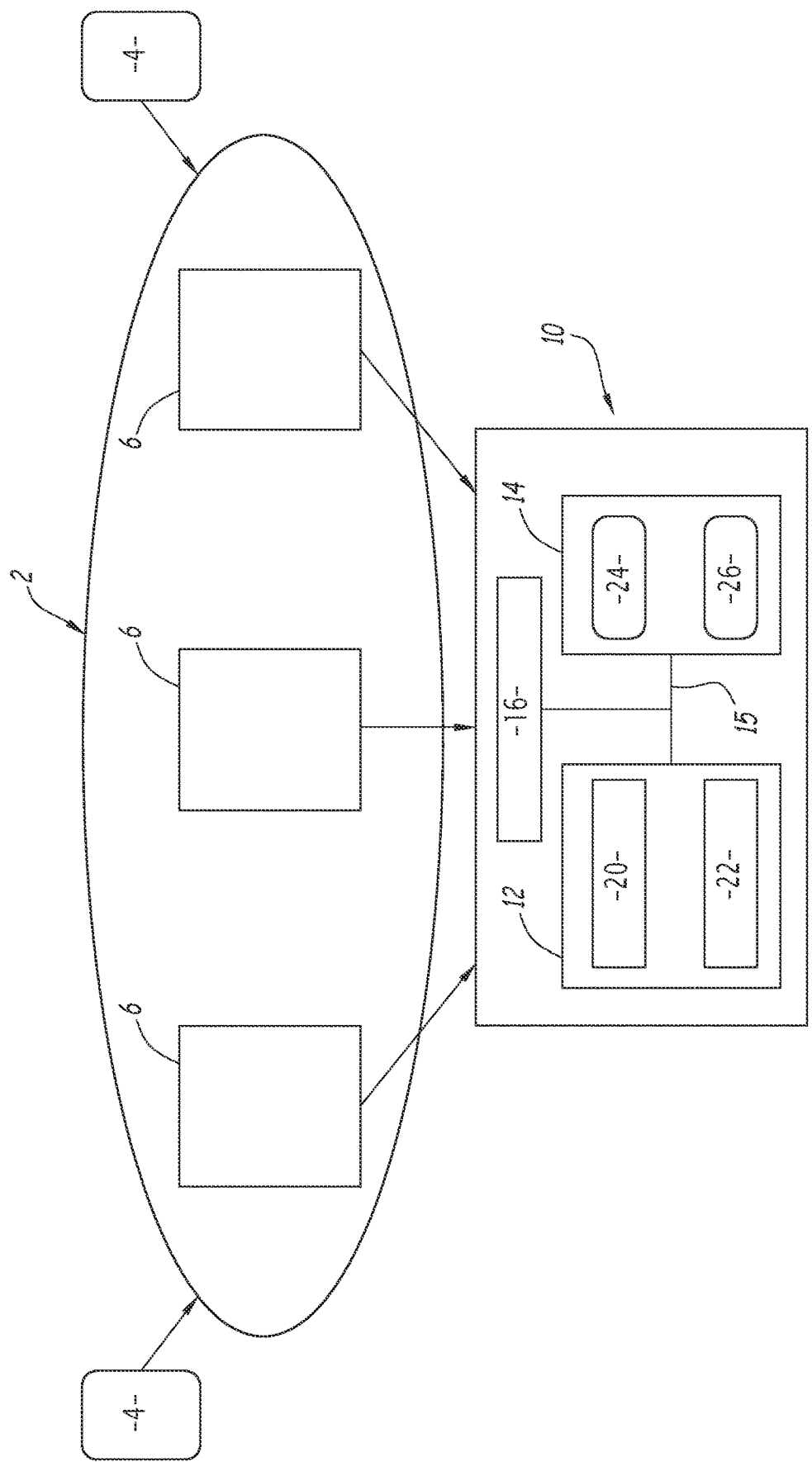
FIG. 1 illustrates schematically a telecommunication network system and a device for estimating a number of distinct subscribers of the telecommunications network impacted by network issues.

FIG. 1 illustrates schematically a telecommunications network 2 to which the method of the invention can be applied to estimate the number of subscribers impacted by network issues.

The architecture of the telecommunications network 2 is not detailed here, since the method of the invention applies to any type of network architecture.

For example, the telecommunications network 2 is based on System Architecture Evolution (SAE), and implements the Long-Term Evolution (LTE) wireless communication standard.

A user can connect to the telecommunications network 2 via a user equipment 4, which is recognized in the network as a subscriber which has an associated unique identifier in the network, i.e. the phone number of the subscriber in a telecommunications network.

In a known manner, the telecommunication network 2 comprises equipment or probes which generate Call Detail Records (CDR) 6 which are data records, that document the various attributes of voice call or other telecommunications transactions (e.g. text message or the like). The CDRs contain various attributes of a call, such as time, duration, completion status, source number, destination number. CDRs are used for various purposes such as billing, logging or law enforcement.

Calls conducted over multiple network equipment and interfaces lead to the generation of multiple CDRs. For example, a voice over LTE service may involve the use of 4 domains, 50 procedures, 15 interfaces and associated equipment with between 20 and 50 CDRs generated. Each CDR provides information about the status of the monitored equipment and interface, and identifies the subscribers whose session the CDR relates to.

According to embodiments, the CDRs are provided to a device 10 for estimating a number of distinct subscribers of a telecommunications network impacted by network issues.

The device 10 is for example a computing device or a general-purpose computer system, comprising one or more processors 12 coupled to an electronic memory 14 via a communication bus 15. The device 10 further comprises a network interface 16, configured to receive data from the telecommunication network 2, in particular to receive CDRs 6 over a number N of successive time periods, called counting periods in the following. For example, each counting period has a duration of one minute, and N=10 successive counting periods are considered. More generally, the number N is a chosen integer value, for example N is comprised between 5 and 60.

The processor 12 is configured to implement a module 20 for determining, for each counting period, an estimate of a number of different subscribers impacted by at least one network issue by implementing a probabilistic counter structure, and storing at least one elementary counter 24 in association to said counting period. Each elementary counter 24 is stored in the electronic memory 14 of the computing device 10. Module 20 implements a first step of a method for estimating a number of distinct subscribers of a telecommunications network impacted by network issues.

The processor 12 is further configured to implement a module 22 for aggregating the elementary counters in a multi-level final counter structure 26, wherein each level of the final counter structure has an associated probabilistic counter structure. The multi-level final counter 26 is stored in the electronic memory 14 of the computing device 10. Module 22 implements a second step of a method for estimating a number of distinct subscribers of a telecommunications network impacted by network issues.

According to an embodiment, the modules 20 and 22 are implemented as software, and stored in the electronic memory 14 of the computing device 10. Alternatively, the modules 20, 22 are stored on a non-volatile information recording medium (i.e. non-transitory computer-readable medium), such as an optical disk, a magneto-optical disk, any type of non-volatile memory (e.g. EPROM, EEPROM, FLASH, NVRAM), a magnetic card or and optical card.

In an alternative embodiment, each of the modules 20, 22 is implemented by a FPGA (Field Programmable Gate Array), or a dedicated integrated circuit such as an ASIC (Applications Specific Integrated Circuit).

Advantageously, the module 22 for aggregating the elementary counters computes a multi-level final counter structure 26 which provides an estimate of the number of distinct subscribers impacted by network issues over M counting periods out of the N counting periods.

Embodiments of modules 20 and 22 are described hereafter.

Figure 2:
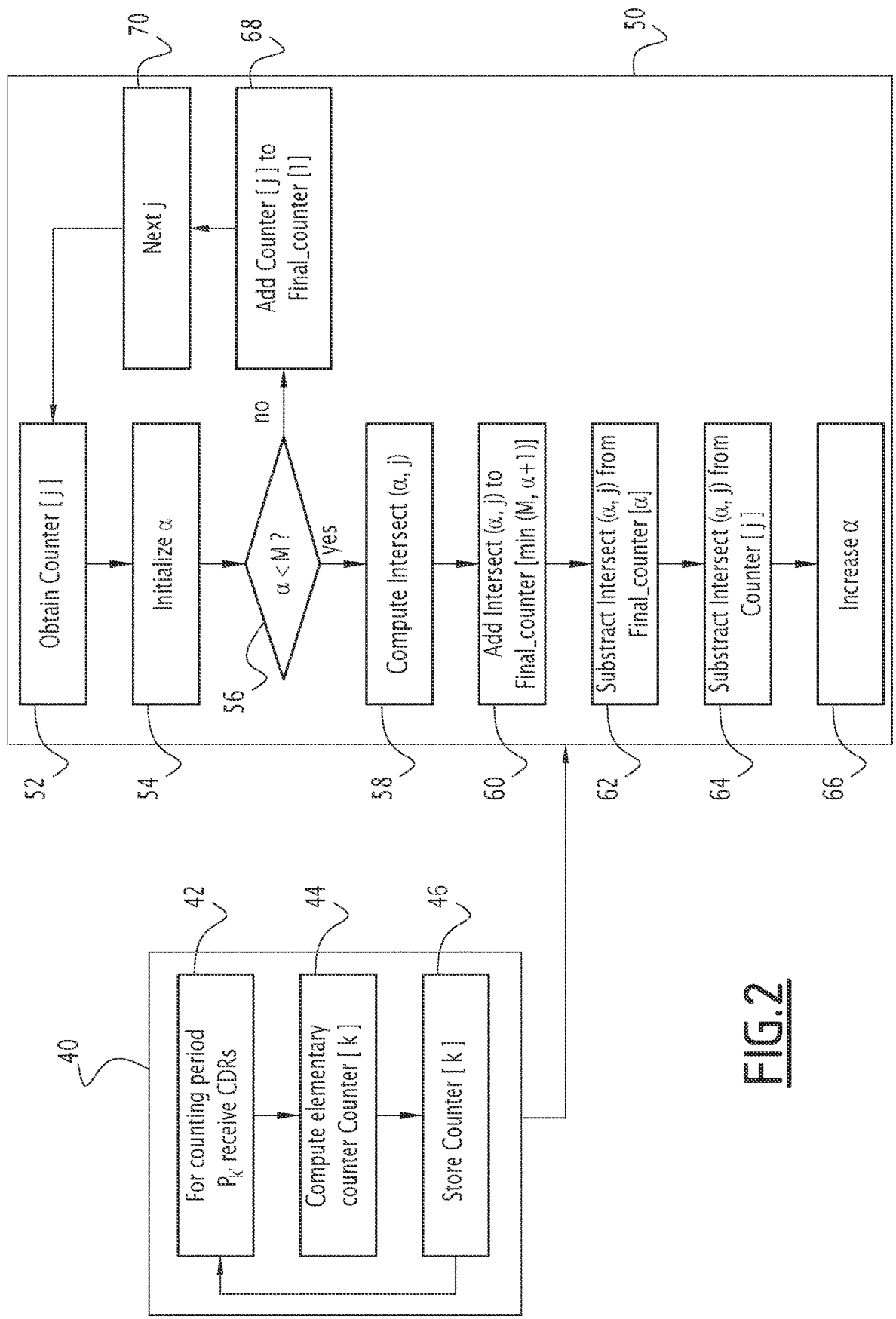
FIG. 2 is a flowchart for a method of estimating a number of distinct subscribers of a telecommunications network impacted by network issues in accordance to an embodiment of the invention.

According to an embodiment, illustrated by the flowchart of FIG. 2, a method for estimating a number of distinct subscribers of a telecommunications network impacted by network issues, implemented by a processor of a computing device, comprising, for a plurality of N successive counting periods preceding a current time comprises a first step 40 and a second step 50.

The first step 40 comprises, for each counting period $P_K$ of N successive periods, receiving 42 CDR reports, computing 44 an elementary counter, which is a probabilistic counter structure by processing data from the CDR report and storing 46 the elementary counters.

Figure 3:
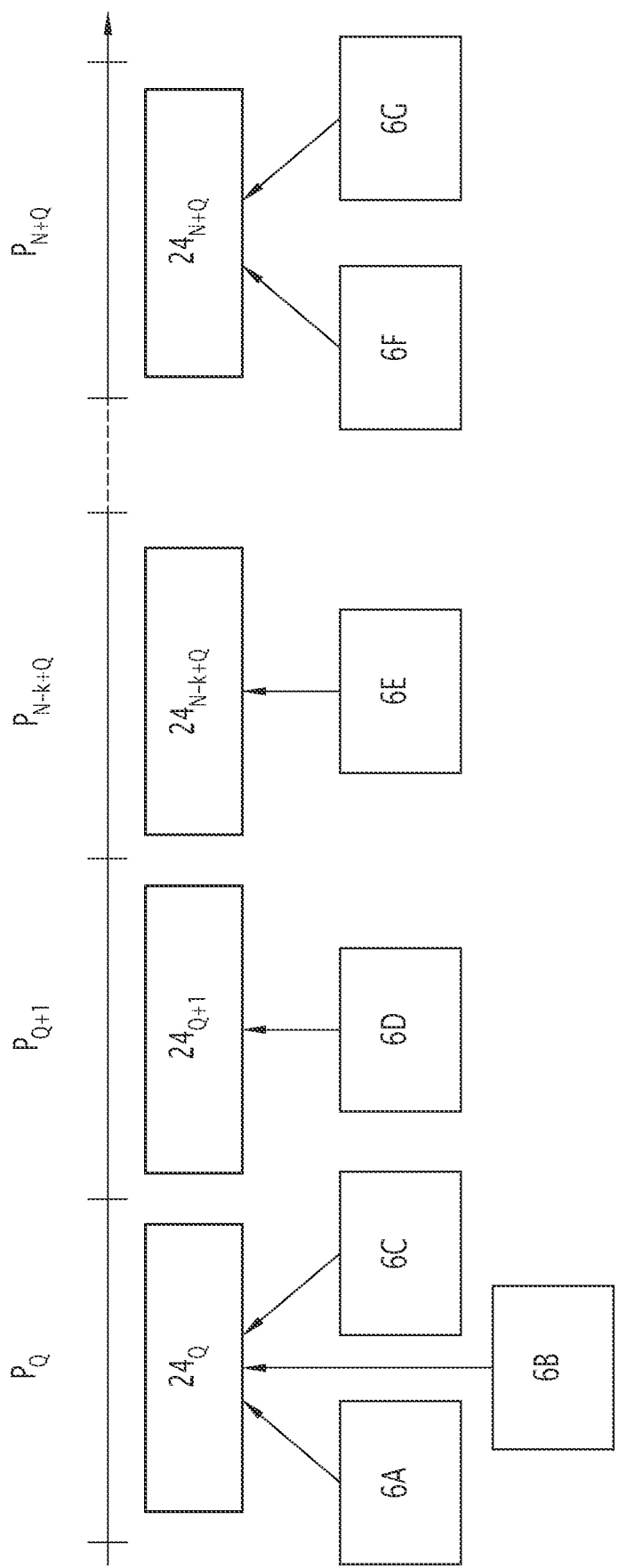
FIG. 3 illustrates schematically a series of successive counting periods and associated elementary counters.

FIG. 3 illustrates schematically a timeline comprising a number of successive counting periods preceding a current time instant Tc. Each counting period has a duration D, preferably comprised between 30 s to 15 minutes, for example equal to 1 minute.

Preferably, the estimation of the number of distinct subscribers impacted by network issues is applied for a sliding window of N counting periods preceding the current time instant Tc.

Each counting period $P_K$ has an associated elementary counter $24_K$ which is probabilistic counter structure, storing probabilistic data for estimating the number of distinct subscribers affected by at least one network issue during the counting period $P_K$.

The computation of each probabilistic counter structure is function of one or several reports of network issues (e.g. various service failures) during the corresponding counting period, obtained from CDRs 6A to 6G.

For each counting period, one or several CDRs containing reports of network issues are processed.

For example, at computation step 44, the computation of each probabilistic counter structure is carried out using a known probabilistic cardinality estimation algorithm, for example based on K-minimum values Sketch. In an embodiment, the Apache Theta Sketch® software is used.

It is further to be noticed that any other probabilistic cardinality estimation algorithm which supports intersection and subtraction operations may be used.

The identifiers of subscribers impacted by network issues are extracted from the received CDRs and are processed, according to their statistical distribution. Advantageously, the values of the identifiers are hashed, so that the data stored in the probabilistic counter structure is compressed.

The second step 50, according to the embodiment of FIG. 2, computes the aggregation of the elementary counters in a multi-level final counter structure, for estimating the number of distinct subscribers which experiment network issues in at least M distinct counting periods over the N counting periods preceding a given time instant Tc or preceding a given time period. The number M is a chosen integer, which is smaller than or equal to N.

For example, M is comprised between 2 and 4.

At initialization, each level of the multi-level final counter comprises an empty probabilistic counter structure.

The method comprises a step 52 of obtaining from the memorized elementary counters a current elementary counter of index j, noted Counter[j], corresponding to a counting period $P_j$, to be processed.

Next, a counting index α is initialized to 1 (step 54), and while α is smaller than M (test 56), an intersection between the current elementary counter Counter[j] and the probabilistic counter structure associated to level α of the multi-level final counter structure Final_counter[α] is computed at computing intersection step 58:

$$\text{Intersect}(\alpha,j) = \text{Counter}[j] \cap \text{Final\_counter}[\alpha] \quad \text{[MATH 1]}$$

The computed intersection comprises a probabilistic list of identifiers of distinct subscribers which belong both to the probabilistic counter structure of the current elementary counter Counter[j] and to the probabilistic counter structure of level α of the final counter structure.

Next, the computed intersection Intersect(α,j) is added (step 60) to the probabilistic counter structure associated to level α+1 of the multi-level final counter structure if α+1 is smaller than or equal to M, or to level M is α+1 is bigger than M. The mathematical formula corresponding to step 60 can be written as:

$$\text{Final\_counter}[\min(\alpha+1,M)] \leftarrow \text{Final\_counter}[\min(\alpha+1,M)] \cup \text{Intersect}(\alpha,j) \quad \text{[MATH2]}$$

The computed intersection Intersect(α,j) is also subtracted (step 62) from the probabilistic counter structure of level α of the final counter structure:

$$\text{Final\_counter}(\alpha) \leftarrow \text{Final\_counter}(\alpha) - \text{Intersect}(\alpha,j) \quad \text{[MATH3]}$$

Steps 60 and 62 are only carried out if α is strictly smaller than M.

Furthermore, the intersection Intersect(α,j) is also subtracted at subtracting step 64 from the current elementary counter Counter[j]:

$$\text{Counter}[j] \leftarrow \text{Counter}[j] - \text{Intersect}(\alpha,j) \quad \text{[MATH4]}$$

Steps 60, 62, 64 may be carried out simultaneously, or successively in any chosen order.

The counting index α is then increased (step 66) and steps 56 to 66 are repeated until the counting index α reaches the value M.

For a given current elementary counter Counter[j], when the counting index α reaches the value M, the remaining of the elementary counter Counter[j] is added (step 68) to the probabilistic counter structure associated to level 1 of the multi-level final counter structure.

$$\text{Final\_counter}[1] \leftarrow \text{Final\_counter}[1] \cup \text{Counter}[j] \quad \text{[MATH5]}$$

Next, a following current elementary counter, associated with a following counting period, is computed (step 70), and steps 52 to 68 are repeated until a number N of elementary counters corresponding to N successive counting periods has been processed. In an embodiment, counter j varies from k to k−N+1, for N counting periods in total.

FIG. 4 illustrates schematically a plurality of elementary counters $24_Q$ to $24_{N+Q}$ and a multi-level final counter structure 26, containing M levels of probabilistic counter structures.

At the end of the processing carried out during the second step 50 of the method for estimating a number of distinct subscribers of a telecommunications network impacted by network issues, the multi-level final counter structure 26 comprises the following:
- the probabilistic counter structure of level 1 of the multi-level final counter structure 26 comprises an estimation of the number of distinct subscribers which experiment at least one network issue over a single counting period during the N successive counting periods,
- the probabilistic counter structure of level 2 of the multi-level final counter structure 26 comprises an estimation of the number of distinct subscribers which experiment at least one network issue over two distinct counting periods during the N successive counting periods,
- the probabilistic counter structure of level α of the multi-level final counter structure 26 comprises an estimation of the number of distinct subscribers which experiment at least one network issue over a distinct periods during the N successive counting periods, and
- the probabilistic counter structure of level M of the multi-level final counter structure 26 comprises an estimation of the number of distinct subscribers which experiment at least one network issue over at least M distinct periods during the N successive counting periods.

The method as described above can be carried out for different equipment or interfaces of the network, and the network issues affecting a number of subscribers over M distinct periods of time can be diagnosed, and troubleshooting can then be applied.

Advantageously, the method described above is implemented in real-time, over a sliding window comprising N counting periods.

Advantageously, the number of subscribers affected by repeated network issues or service failures is computed.

As noted herein, the invention provides a more accurate identification of subscribers affected by problems because only subscribers affected several times in the time periods are counted. This approach provides improved granularity relative to the prior art. Specifically, dividing the timeline into successive time periods and using the probabilistic counter structure allows the present approach to more accurately estimate the number of issues. The conventional approach applies a probabilistic sampling over an entire timeline whereas the invention provides the probabilistic sampling over smaller time periods with more granularity. This approach provides significantly better results in terms of estimating subscribers impacted by problems. Advantageously, improvements in impacted subscribers allows telecommunication network operators to remediate and solve problems in a more efficient manner, e.g. by addressing problems in some order based on subscriber impact.

According to a variant, the method as explained above with reference to FIG. 2 may be applied by associating a probabilistic counter structure to each CDR within a given counting period. Then, at the expense of a higher computational cost, it is possible to compute the number of subscribers impacted by at least M network issues over one or several periods of the last N counting periods. Indeed, in this variant, a loop through all levels of counter[j] is implemented and the result is merged with all levels of final_counter, therefore more computations are needed.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for estimating a number of distinct subscribers of a telecommunication network impacted by network issues, the method comprising for a plurality of N successive counting periods preceding a current time:
   determining, for each counting period, an estimate of a number of different subscribers impacted by at least one network issue by implementing a probabilistic counter structure, and storing at least one elementary counter in association to said counting period,
   aggregating the elementary counters in a multi-level final counter structure, wherein each level of the final counter structure has an associated probabilistic counter structure, the aggregation comprising, for each elementary counter:
      computing, for at least one level of the multi-level final counter structure, an intersection between said elementary counter and the probabilistic counter structure associated to said level of the multi-level final counter structure, and
      updating the multi-level final counter structure based on the intersection computed.

2. The method of claim 1, wherein the updating of the multi-level final counter structure comprises adding the intersection computed for a given level of the multi-level final counter structure to the probabilistic counter structure of a next level of the multi-level final counter structure.

3. The method of claim 2, wherein the updating of the multi-level final counter structure further comprises subtracting the intersection computed from the probabilistic counter structure of the given level of the multi-level final counter structure.

4. The method of claim 1, further comprising:
   updating the elementary counter by subtracting the intersection computed from the probabilistic counter structure of said elementary counter.

5. The method of claim 1, wherein, for each elementary counter, the computing of an intersection and the updating are carried out for each level of the multi-level final counter structure.

6. The method of claim 5, further comprising:
   after carrying out the computing of an intersection and the updating for each level of the multi-level final counter structure, adding the probabilistic counter structure of said elementary counter to the first level of the multi-level final counter structure.

7. The method of claim 1, wherein, for estimating the number of distinct subscribers impacted by network issues in at least M distinct counting periods over N successive counting periods, the updating comprises adding the intersection computed for a given level $\alpha$ to the following level $\alpha+1$ of the multi-level final counter structure if $\alpha+1$ is smaller than M, or to level M of the multi-level final counter structure otherwise.

8. The method of claim 1, wherein the determining, for each counting period, of an estimate of a number of different subscribers impacted by at least one network issue comprises:
   receiving a data record comprising identifiers of subscribers impacted by network issues and
   processing said identifiers by a probabilistic cardinality estimation algorithm to obtain a probabilistic counter structure.

9. A device for estimating a number of distinct subscribers of a telecommunication network impacted by network issues, the device comprises:
   at least one processor; and
   memory comprising instructions that, when executed, cause the at least one processor to implement, for a plurality of N successive counting periods preceding a current time, steps of:
      determining, for each counting period, an estimate of a number of different subscribers impacted by at least one network issue by implementing a probabilistic counter structure, and storing at least one elementary counter in association to said counting period,
      aggregating the elementary counters in a multi-level final counter structure, wherein each level of the final counter structure has an associated probabilistic counter structure, the aggregation comprising, for each elementary counter:
         computing, for at least one level of the multi-level final counter structure, an intersection between said elementary counter and the probabilistic counter structure associated to said level of the multi-level final counter structure, and updating the multi-level final counter structure based on the intersection computed.

10. The device of claim 9, wherein the updating of the multi-level final counter structure comprises adding the intersection computed for a given level of the multi-level final counter structure to the probabilistic counter structure of a next level of the multi-level final counter structure.

11. The device of claim 9, wherein the instructions that, when the steps further include updating the elementary counter by subtracting the intersection computed from the probabilistic counter structure of said elementary counter.

12. The device of claim 9, wherein, for each elementary counter, the computing of an intersection and the updating are carried out for each level of the multi-level final counter structure.

13. The device of claim 9, wherein, for estimating the number of distinct subscribers impacted by network issues in at least M distinct counting periods over N successive counting periods, the updating comprises adding the intersection computed for a given level $\alpha$ to the following level $\alpha+1$ of the multi-level final counter structure if $\alpha+1$ is smaller than M, or to level M of the multi-level final counter structure otherwise.

14. The device of claim 9, wherein the determining, for each counting period, of an estimate of a number of different subscribers impacted by at least one network issue comprises:

receiving a data record comprising identifiers of subscribers impacted by network issues and processing said identifiers by a probabilistic cardinality estimation algorithm to obtain a probabilistic counter structure.

15. A non-transitory computer-readable medium comprising instructions for estimating a number of distinct subscribers of a telecommunication network impacted by network issues, the instructions, when executed by at least one processor, are configured to implement steps of, for a plurality of N successive counting periods preceding a current time:

determining, for each counting period, an estimate of a number of different subscribers impacted by at least one network issue by implementing a probabilistic counter structure, and storing at least one elementary counter in association to said counting period, aggregating the elementary counters in a multi-level final counter structure, wherein each level of the final counter structure has an associated probabilistic counter structure, the aggregation comprising, for each elementary counter:

computing, for at least one level of the multi-level final counter structure, an intersection between said elementary counter and the probabilistic counter structure associated to said level of the multi-level final counter structure, and updating the multi-level final counter structure based on the intersection computed.

16. The non-transitory computer-readable medium of claim 15, wherein the updating of the multi-level final counter structure comprises adding the intersection computed for a given level of the multi-level final counter structure to the probabilistic counter structure of a next level of the multi-level final counter structure.

17. The non-transitory computer-readable medium of claim 15, further comprising the step of updating the elementary counter by subtracting the intersection computed from the probabilistic counter structure of said elementary counter.

18. The non-transitory computer-readable medium of claim 15, wherein, for each elementary counter, the computing of an intersection and the updating are carried out for each level of the multi-level final counter structure.

19. The non-transitory computer-readable medium of claim 15, wherein, for estimating the number of distinct subscribers impacted by network issues in at least M distinct counting periods over N successive counting periods, the updating comprises adding the intersection computed for a given level $\alpha$ to the following level $\alpha+1$ of the multi-level final counter structure if $\alpha+1$ is smaller than M, or to level M of the multi-level final counter structure otherwise.

20. The non-transitory computer-readable medium of claim 15, wherein the determining, for each counting period, of an estimate of a number of different subscribers impacted by at least one network issue comprises:

receiving a data record comprising identifiers of subscribers impacted by network issues and processing said identifiers by a probabilistic cardinality estimation algorithm to obtain a probabilistic counter structure.

* * * * *